United States Patent [19]
Fromherz

[11] Patent Number: 5,771,339
[45] Date of Patent: Jun. 23, 1998

[54] METHOD FOR AUTOMATICALLY DERIVING PRINT ENGINE CAPABILITIES FOR INCREMENTAL SCHEDULING FROM COMPOSITIONAL PRINT ENGINE MODELS

[75] Inventor: Markus P. J. Fromherz, Palo Alto, Calif.

[73] Assignee: Xerox Corporation, Stamford, Conn.

[21] Appl. No.: 485,848

[22] Filed: Jun. 7, 1995

[51] Int. Cl.[6] .................................................. G06K 15/00
[52] U.S. Cl. ........................................ 395/112; 395/101
[58] Field of Search .................................... 395/101, 112, 395/114, 650, 109, 115, 116, 117, 500, 800, 904; 364/551.01, 578, DIG. 1, DIG. 2, 977.5, 149, 150, 151, 468.05, 468.06, 468.01, 468.02, 468.03, 468.04, 468.08, 468.09, 468.13, 468.15; 358/296, 468; 355/207, 204

[56] References Cited

U.S. PATENT DOCUMENTS

| | | | |
|---|---|---|---|
| 4,991,176 | 2/1991 | Dahbura et al. | 371/27 |
| 5,038,307 | 8/1991 | Krishnakumar et al. | 364/578 |
| 5,056,014 | 10/1991 | Burrows | 395/800 |
| 5,095,342 | 3/1992 | Farrell et al. | 399/401 |
| 5,095,369 | 3/1992 | Ortiz et al. | 358/296 |
| 5,107,299 | 4/1992 | Farrell et al. | 399/19 |
| 5,125,098 | 6/1992 | Burrows | 395/800 |
| 5,161,115 | 11/1992 | Teshima et al. | 364/551.01 |
| 5,179,410 | 1/1993 | Farrell et al. | 399/9 |
| 5,187,587 | 2/1993 | Farrell et al. | 359/296 |
| 5,287,194 | 2/1994 | Lobiondo | 395/114 |
| 5,301,100 | 4/1994 | Wagner | 364/148 |
| 5,325,528 | 6/1994 | Klein | 395/680 |
| 5,337,135 | 8/1994 | Malachowski et al. | 399/401 |
| 5,337,258 | 8/1994 | Dennis | 364/551.01 |
| 5,363,175 | 11/1994 | Matysek | 399/77 |
| 5,408,663 | 4/1995 | Miller | 395/674 |
| 5,469,533 | 11/1995 | Dennis | 395/114 |

OTHER PUBLICATIONS

Xerox Disclosure Journal; vol. 15, No. 5; Sep./Oct. 1990.

*Primary Examiner*—Edward L. Coles, Sr.
*Assistant Examiner*—Dov Popovici
*Attorney, Agent, or Firm*—Fay, Sharpe, Beall, Fagan, Minnich & McKee

[57] ABSTRACT

A method and apparatus is provided for compositional modeling of print engines. The system automatically derives a complete list of all of the capabilities of a described print engine. The method includes providing compositional models of components forming the print engine. The models describe local capabilities of each component including part transformation abilities as well as timing constraints. Using the component models, configurations are created by connecting the components. Once the component models are connected, the capabilities of the configurations are directly derived. A capability is a part that can be produced by the configuration, together with the itinerary required to produce the part, the inputs from which the output is assembled, and the timing constraints to be observed when executing the itinerary. Capabilities are the fundamental connection between the description of a job to be printed by a print engine and the print engine scheduling and control software. Capabilities are themselves compositional and are used to automatically derive scheduling and control software for customer-configured print engines.

9 Claims, 4 Drawing Sheets

METHOD FOR AUTOMATICALLY DERIVING PRINT ENGINE CAPABILITIES FOR INCREMENTAL SCHEDULING FROM COMPOSITIONAL PRINT ENGINE MODELS

BACKGROUND OF THE INVENTION

This is a related application to commonly owned U.S. patent application Ser. No. 08/476,510, filed Jun. 7, 1995, entitled A SYSTEM FOR GENERICALLY DESCRIBING AND SCHEDULING OPERATION OF A MODULAR PRINTING MACHINE; U.S. patent application Ser. No. 08/472,151, filed Jun. 7, 1995, entitled A GENERIC SYSTEM FOR DESCRIBING AND USING RESOURCES FOR PRINT ENGINE SCHEDULING; U.S. patent application Ser. No. 08/485,846, filed Jun. 7, 1995, entitled A SYSTEM FOR AUTOMATICALLY CONFIGURING PRINT ENGINE SOFTWARE FROM PRINT ENGINE MODULE CAPABILITIES; U.S. patent application Ser. No. 08/486,646 filed Jun. 7, 1995, entitled A GENERIC METHOD FOR SCHEDULING PRINT ENGINES USING PRINT ENGINE CAPABILITIES; and U.S. patent application Ser. No. 08/475,003, filed Jun. 7, 1995, entitled A GENERIC METHOD FOR AUTOMATICALLY GENERATING FINITE-STATE MACHINES FOR SCHEDULING FROM PRINT ENGINE CAPABILITIES; the contents of each of which are incorporated herein by reference.

This application pertains to the art of printing machines and more particularly to photo-duplication machines such as copiers.

The invention is particularly applicable to a generic description format for describing components independently of their environment or interaction with other components. The system allows for automated scheduling of printing jobs pursuant to the capabilities associated with modular components forming a printing machine, and will be described with particular reference thereto. However, it will be appreciated that the invention has broader application, such as in providing for an automated assessment of machine capabilities in view of modular components, as well as job specific utilization in an efficient manner in view of the same.

Present day machinery, such as photocopiers, is often constructed from pre-fabricated components. Such fabrication allows for mass production of each of the subassemblies of a machine while simultaneously allowing for customization to consumer's needs. Further, a consumer is provided with a means by which he or she may alter or upgrade capabilities of an existing base unit.

Earlier systems for distributed printing and distributed job scheduling may be found in U.S. Pat. Nos. 5,287,194 and 5,363,175 commonly owned by the assignee hereof.

One concern with modular assembly of integrated units is provided with configuring and optimizing use of a completed system. While this is a concern for the manufacturer of an initial unit, it is perhaps an even greater concern to the end user. End users are often technically unsophisticated. However, they are driven by a desire for increased capability of a machine. At the same time, they would like to avoid increasing their initial investment. Consumers are also dissuaded from expenses associated with hiring a professional to upgrade or configure existing equipment.

The present invention contemplates a new and improved system for automatically ascertaining machine capability and utilizing the same which overcomes the above-referenced problems, and others, and provides a system with enhanced usability and configurability both prior to and after the machine leaves the factory.

SUMMARY OF THE INVENTION

In accordance with the present invention, there is provided a system for generically and uniquely describing capabilities of various individual modular machine components.

In accordance with another aspect of the present invention, a system is provided for integrating such generic component descriptions so as to allow for automatically recognizing a presence of one or more subassemblies and communicating their various functional descriptions to a centralized processor unit for assessment and analysis.

In accordance with another aspect of the present invention, the system provides for an environment adapted for efficient, automated scheduling of a plurality of print jobs of various or varying characteristics.

An advantage of the present invention is the provision of a printing machine model that is conducive to being easily and automatically configured to various or varying subassemblies.

Another advantage of the present invention is the provision of a printing machine that is adapted to be readily configured to maximum potential by an end-user.

Yet another advantage of the present invention is a provision of a printing machine that maximizes printing throughput by being adapted for efficiently scheduling and utilizing modular subassemblies in accordance with user-specified print jobs.

Further advantages will become apparent to one of ordinary skill in the art upon a reading and understanding of the subject specification.

BRIEF DESCRIPTION OF THE DRAWINGS

The invention may take physical form in certain parts, and arrangements of parts, a preferred embodiment of which will be described in detail in this specification and illustrated in the accompanying drawings which form a part hereof, and wherein.

DETAILED DESCRIPTION OF THE PREFERRED EMBODIMENTS

Figure 1:
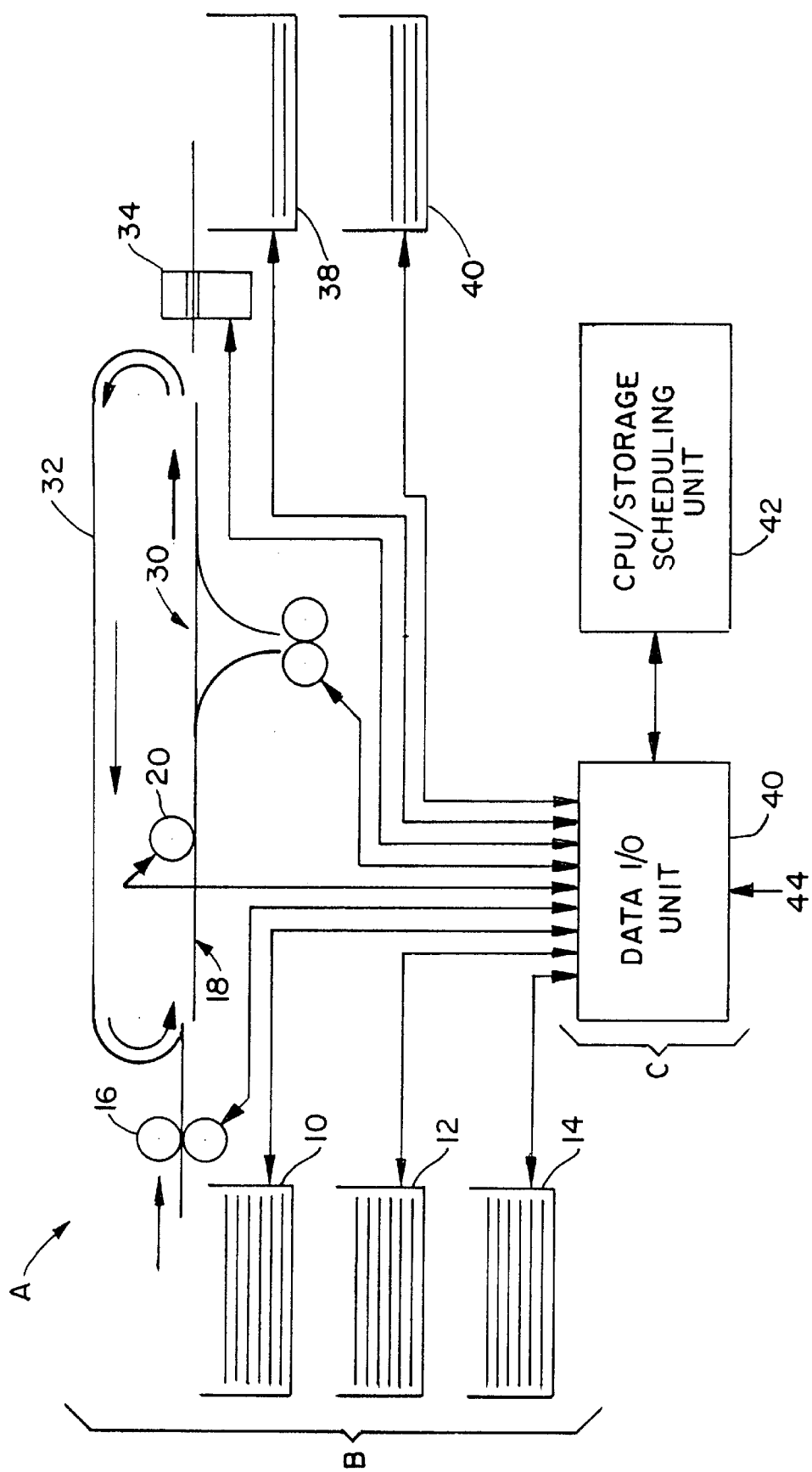
FIG. 1 provides a schematic of a representative, modular printing machine incorporating the automated configuration and scheduling of the subject invention.

Turning now to the drawings wherein the purpose is for illustrating the preferred embodiment of the invention only, and not for the purpose of limiting the same, FIG. 1 illustrates an embodiment of the subject invention having a modular print engine A which includes a plurality of modules or subassemblies B and a data-processor unit for configuration and scheduling C. As used herein "print engine" includes any reprographic machine, such as printers, copiers, facsimile machines, and the like.

As will be detailed below, various capabilities provided with each of the modules B are ascertained and correlated in the data processor unit C. Such correlated and analyzed data is further analyzed in view of user input defining a desired printer operation, or series of operations. This, in turn, is used to optimize, schedule, and control operation of the printing machine to most efficiently accomplish the series of printing tasks. The subject system is described by way of example with a copier machine. It will be appreciated that generic description, resource assessment and scheduling may be practicable on any modular, material handling system.

With the particular example of FIG. 1, the modules B are illustrated as including a plurality of paper storage bins. In the illustration, these include bins 10, 12, and 14. The plurality of bins may be representative of different paper sizes or secondary or reserved storage capability. A sheet feeder mechanism is illustrated schematically at 16. As will be appreciated by one of ordinary skill in the art, a sheet feeder such as that illustrated at 16 will function to obtain sheet stock from one or more of the bins.

The feeder 16 will feed sheet stock to a conveyor 18. The conveyor will, in turn, feed sheet stock to a print mechanism 20, the particular construction of which will be well within the understanding of one of ordinary skill in the art. Also illustrated in the figure is an inverter mechanism 30 that may selectively invert or flip sheet stock that progresses along the conveyor 18. A feedback-unit 32 is provided for returning sheet stock to the printer mechanism 20 for duplex printing thereof.

In the illustration, the conveyor 18 provides a path to a stapling mechanism 34 for selective stapling of printed documents. The final, illustrated component in the group of modules B illustrates a plurality of output bins represented by bins 38 and 40.

Turning to the data processor unit C, included therein is a data input/output ("I/O") unit 40 which is in data communication with a central processor unit ("CPU")/storage scheduling unit 42, the details of which will be described further below. A data path is provided between the data I/O unit 40 and each of the modules B.

In the preferred embodiment, each module B includes therein a description associated with various functions and capabilities thereof. The particulars of such a generic description will be detailed below. The data path between each of the illustrated modules and the data I/O unit allows for acquisition to the data processor unit C of all such description. In the preferred embodiment, any module B will communicate its associated description to the data I/O unit upon connection to the modular print engine A. This ability allows for "plug-and-play" capability of the subject system.

Data interconnections between the data I/O unit 40 of the data processor C and the various modules B also allow for controller activation thereof. Thus, the data processor unit C has ascertained from the available modules the complete set of capabilities of the modular print engine A. This information, coupled with user input 44 to the data I/O unit 40 allows for efficient scheduling of available, modular resources to accomplish a series of printing jobs by use of the available components.

Figure 2:
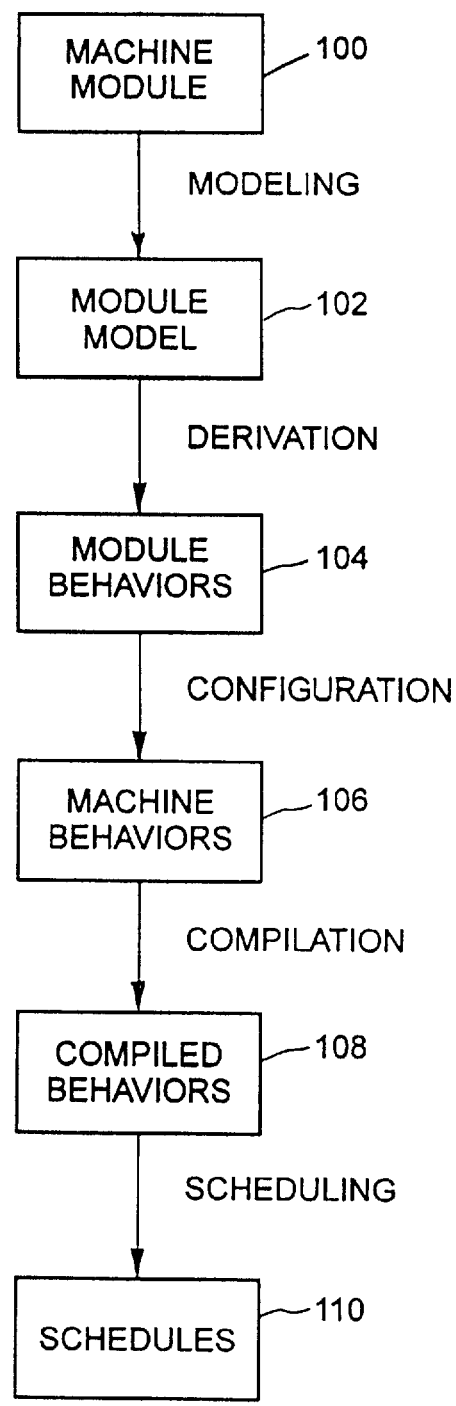
FIG. 2 provides a flow chart detailing the hierarchical ordering of operations to accomplish the configuration and scheduling of the present invention.

Turning next to FIG. 2, the basic format for generic print engine description and scheduling will be described. As alluded to earlier, past attempts for automated print engine scheduling software were based on an analysis of a complete engine configuration. The results of this analysis are required for writing of dedicated software specific to a particular configuration. Conversely, the subject system provides for separation of scheduling software into two parts. In a first part, a scheduler architecture is provided with generic algorithms. In a second part, machine-specific information is also provided in a format detailed below.

Given a document to be printed on a given print engine, a scheduler is provided which serves to identify, schedule, and initiate machine operations for producing a document. In the illustration of FIG. 1, such operations may include feeding of sheets, moving of sheets, preparation of images, transferring of images to sheets, etc. It will be appreciated that a document to be printed typically arrives incrementally (e.g., sheet-by-sheet). Scheduling and schedule execution (printing) usually happen concurrently. As a consequence, machine-specific information used by a scheduler is advantageously structured such that the scheduler is able to identify which operations will produce the required sheet. Further, the system must be aware of constraints which must be observed when scheduling operations. Additionally, the system is provided with a means by which it may send appropriate commands to the modules to allow them to accomplish their available functions.

In the diagram of FIG. 2, the particular system for preparing the machine-specific information is depicted. The system commences by using declarative descriptions (models) of printing engine modules in block 100. Such a model advantageously contains description of a module's structure and potential behavior of its components. As noted in the example of FIG. 1, possible components include feed trays, transport belts, transfer components, inverters, gates, etc. Potential behaviors may be, by way of example, either bypassing an inverter or using it to invert a sheet. The step of modeling is typically performed by an engineer using a modeling language, the details of a preferred embodiment of which will be provided below.

At block 102, a module has already been modeled by its components. Next, an automatic derivation of potential behaviors of an entire module is then fabricated from information obtained from the component models. This derivation may be performed, by way of example, by simulation or partial evaluation, and by envisionment. Simulation is commonly understood as the execution of models to mirror the execution of the real system. Partial evaluation is commonly understood as the partial execution of programs, leaving certain parts of the programs unexecuted and to be evaluated at a later time. Envisionment is commonly understood as the exploration of all potential behaviors of a system by, for example, repeatedly and in various ways exercising simulation or partial evaluation of its models. The resulting module behavior is comprised of an output produced by a particular behavior, inputs from which the output is produced, individual operations required to produce it (its "itinerary"), as well as various constraints on resources and timings to be observed when performing the operations. Some or all of this information may advantageously be precompiled. By way of example, this may be compiled to finite-state machines.

When print engine modules B (FIG. 1) are plugged together to form a new configuration, different module behaviors are collected and automatically composed via the data processor unit C to generate potential behaviors of a complete print engine A.

The afore-noted composition is also suitably enabled to occur dynamically, i.e., each time a behavior is to be selected by the scheduler, it composes module behaviors on-the-fly. Thus, a composition may be done only once (after modules are first plugged together), or each time they are needed. The latter option has an advantage of accounting for dynamic module changes. Thus, the system may complete the FIG. 2 sequence each time a machine behavior is selected. It may be prohibitive to do so due to the time-consuming computations. However, this may be a more efficient approach in specific circumstances.

In block 104, the afore-noted, overall behavior is advantageously modeled in a format similar to that associated with the individual module behavior noted above. Per distinct overall behavior, the system provides an output description (for behavior identification), resource and timing constraints (for sequencing), and data comprising an itinerary (for subsequent control of machine operations).

Next, a portion of machine behavior information is advantageously compiled for efficient use in a matching scheduler algorithm at which point the system progresses to block 106. By way of example, a compilation of potential interactions of timing and resource constraints may be made to a finite-state machine. An example of finite-state machine scheduling may be found in the co-owned U.S. patent application Ser. No. 08/426,207, filed Apr. 21, 1995, entitled PRINT SEQUENCE SCHEDULING SYSTEM FOR DUPLEX PRINTING APPLICATION, which issued as U.S. Pat. No. 5,504,568, on Apr. 2, 1996, entitled PRINT SEQUENCE SCHEDULING SYSTEM FOR DUPLEX PRINTING APPARATUS, the contents of which are incorporated herein by reference. At block 108, a full set of compiled behaviors has been obtained.

Lastly, at block 110, an output description of machine behaviors is used by a generic scheduler to identify behaviors that will produce an output document given the original constraints (either in original or compiled form). These are used to find a correct timing for each particular behavior's operation and itineraries which are used to initiate necessary operations of the modules B.

While the foregoing description is provided by way of preferred embodiment, it will be appreciated that not all of the steps are required to provide a usable system. For example, only a portion of all components need be modeled and compilation of all constraints need not be accomplished.

With the system described above, modular ("plug-and-play") scheduling of print engine modules is facilitated. The system also allows for reuse of scheduling software for a wide range of configurations. It also provides for automating all steps but that of obtaining the initial description of the discrete modules forming the machine and for development of the generic scheduling algorithms.

Figure 3:
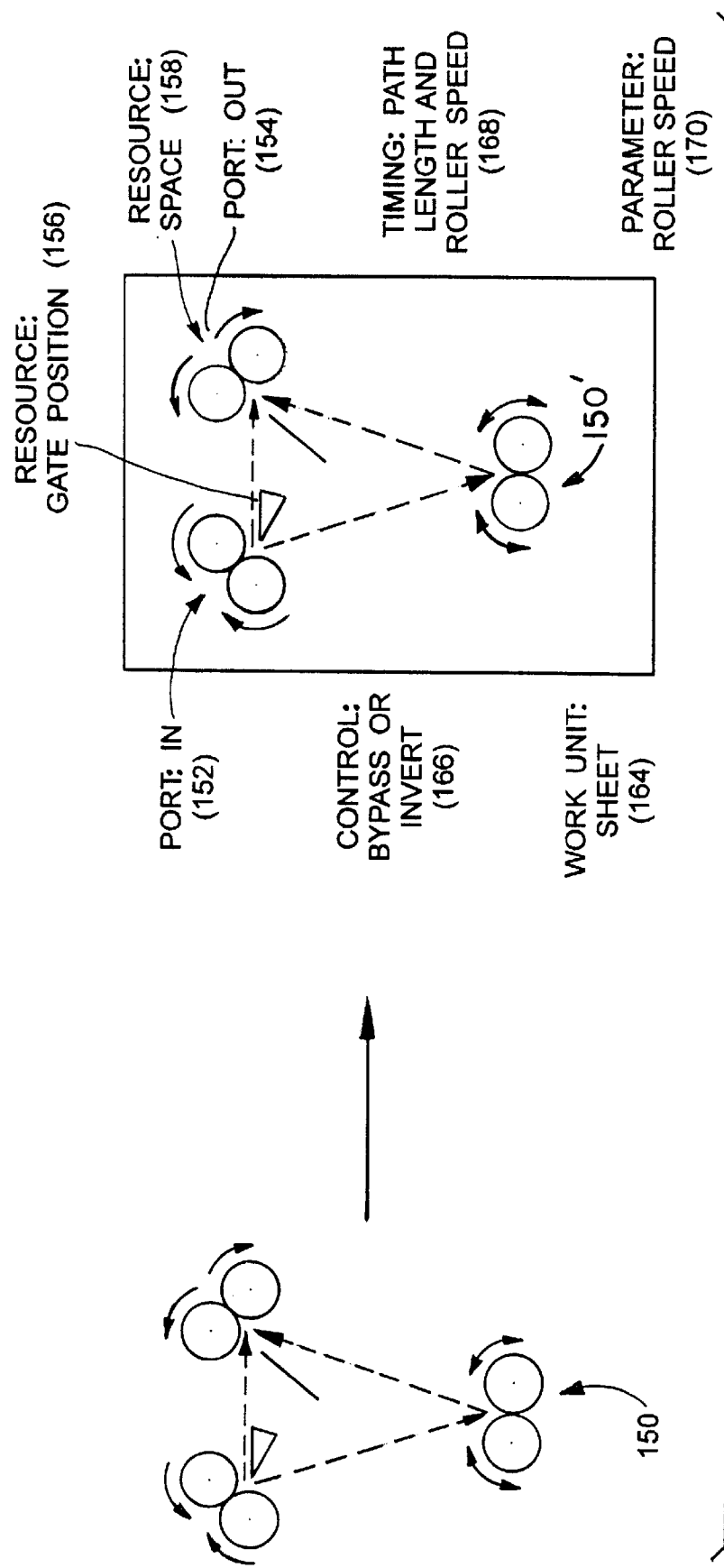
FIG. 3 provides a diagram of a representative, generic description of a print machine component as used in connection with the subject, automated scheduling and configuration of the subject invention.

Turning now to FIG. 3, a particular system for modeling component behavior will be described. The particular system of the preferred embodiment is for a description of print engine component behavior for print engine analysis, simulation, and scheduling. As noted above, the basic, generic description method is equally applicable to various other modular systems.

In the subject description method, structure and behavior of components is described in terms of capabilities (potential operations) for which constraints on work units, timings, and resources are stated. This modeling system enables structural and behavioral composition of components for analysis and simulation of component interactions in print engines. The system is particularly applicable for scheduling operation of modular print engines.

With the subject scheme, one may describe print engine components such that print engines fabricated therefrom may be described by composing component descriptions. Further, various applications may be performed automatically on resulting print engine description. This enables one to automatically use such information for analysis, simulation, scheduling, and related print engine applications. In the illustrated example of FIG. 3, descriptions associated with an inverter 150, analogous to the inverter 30 of FIG. 1, are provided with model 150'. Components of a modeled structure and behavior are determined by both the physics of the component itself, as well as an application context in which a model is used.

In the system, a structure model of a component is defined as consisting of its physical interface, software interface and internal resources. For example, a physical interface is an input port 152 along which work units (sheets) enter and a port 154 from which said work units exit. Associated software interface functions primarily for control commands and parameters. Internal resources are defined as objects needed to perform a particular behavior, where multiple uses of the object by repeated execution of the behavior is restricted. By way of example in FIG. 3, a resource is defined as the position of an associated gate 156. Another example of a resource is a space 158 between opposing output rollers 160 of the inverter 150, particularly illustrated at 150'. Here, as with most points of the paper path, there is sufficient space for only one sheet at any single point in time. Thus, the space 158 is defined as a resource.

A behavior model of a component is utilized to describe capabilities of the particular component in terms of how the component may work on work units moving through the component. Further, the behavior dictates what constraints must be observed when performing the associated behavior.

A component capability is defined as consisting of a description of work units and a transformation of work units, timed events like the input and output of a work unit, of resource allocations for this transformation, and of constraints on the timing of such events and resource allocations. Work units are advantageously described in terms of their attributes. Restrictions and transformations of work units are advantageously described in terms of constraints on their attributes.

In FIG. 3, some additional model descriptions are provided. These include a description associated with a particular work unit, such as a sheet illustrated at 164. A control situation, such as whether or not to bypass the inverter 150 or utilize it for inversion is illustrated at 166. A timing parameter, such as a specification of path length and roller speed is provided at 168. By way of example, associated timing constraints are suitably obtained using a formula based on path length and roller speed, e.g., time out may be defined as time in plus path length, divided by roller speed. Certain values are also suitable parameters of the model, e.g., the path length of a given inverter is fixed, while roller speed may vary and may therefore be set by the environment with respect to a model that is used. A roller speed parameter is illustrated at 170.

By way of particular example, the following listing provides a suitable model of an inverter as depicted in connection with FIG. 3:

```
Component inverter(length: Millimeters, speed: MillimetersPerSecond) Has
        EntryPorts in: Sheet;
        ExitPorts out: Sheet;
        Resources inR, outR: Signal; gateR: State({Bypassing,Inverting}, Bypassing);
        Variables s, s_in, s_out: Sheet; t_in, t_out, t_gate: Interval;
        Capability bypass(t_n) Is
                in.input(s, t_n);
                out.output(s, t_out);
                inR.allocate(l, t_in);
                outR.allocate(l, t_out);
                gateR.allocate(Bypassing, t_gate);
                t_in.START + length/speed = t_out.START;
                t_in.DURATION = t_out.DURATION;
                t_gate.START = t_in.START;
                t_gate.END = t_out.END
        End bypass;
        Capability invert(t_in) Is
                in.input(s_in, t_out);
                out.output(s_out, t_out);
                inR.allocate(l, t_n);
                outR.allocate(l, t_out);
                gateR.allocate(Inverting, t_gate);
                s_out = s_in_with
                                {SHEET.ORIENTATION=
                                Rotate(Y, 180, s_in.SHEET, ORIENTATION)};
                t_in.START + length/speed +
                SheetLength(s_in.SHEET.SIZE)/speed=t_out.START;
                t_in.DURATION = t_out.DURATION;
                t_gate.START = t_in.START;
                t_gate.END = t_out.END
        End invert
End inverter.
```

This model declares two parameters (length and speed), one entry port (in), one exit port (out), three resources (inR, outR and gateR, of types Signal respectively State), and six variables (of types Sheet and Interval). Then the model defines two capabilities (bypass and invert). For capability bypass, it is defined that a sheet s enters at time t_in and exits at time t_out, that allocations in all three resources are made at the respective intervals t_in, t_out and t_gate, and that various timing constraints reflecting the traveling time from entry to exit hold between the intervals. Capability invert is defined similarly, except that the sheet changes its orientation by 180° (rotated around the y axis), and that the traveling time is longer (proportional to the sheet's size). Thus, it will be appreciated that a complete and functional description of any component may be similarly provided.

With the disclosed modeling system, a component structure is described without relying on any reference to descriptions of or interactions with other components. Such component behavior is described on one work unit without other units. Further, the disclosed modeling system enables automatic behavioral composition of component capabilities for generic and incremental analysis, simulation, and scheduling of print engines. This description format allows automatic structural composition of component models to models describing connected components (for example, print engine modules).

Conversely, earlier approaches had their capabilities and constraints expressed in terms of both specific interactions between components and interactions between sequences of sheets or images. This renders them more difficult to define, renders them non-reusable, and further renders them non-compositional. The system modeling format allows for the automatic configuration, optimization, and scheduling described above.

As will be appreciated from the foregoing, scheduling a print engine is, to a large part, a scheduling of associated resources. To do this effectively, one must model the resources used by a print engine operation such that information may be used for incremental scheduling of valid sequences of those operations. Besides being applicable to a wide range of print engine operations, resources may also suitably serve as generic interfaces between a scheduler and the rest of the print engine control software for purposes of communicating changes in the machine.

Components of a machine, such as a print engine, will usually require resources to perform their capabilities. By way of example particular to a printing machine, a resource may be space on a belt, a gate that must be in a certain position, or some element that is being placed for multiple or overlapping uses. One may view the capacity of a bin of paper as being one instance of such multiple or overlapping uses.

Allocations of resources are suitably modeled explicitly as a part of a description of a component's behavior. As used herein, resource allocation is defined as a specification of a resource requirement, together with a time interval during which a particular resource is required. Again, by way of example, an imaging capability requires space on a photoreceptor belt for a certain amount of time. As another example, an invert capability requires an inverter gate to be in a correct position while a sheet is being inverted.

As defined herein, a resource requirement is chosen to depend on a particular type of resource. Possible resource types include such items as Boolean resources (resources which are either used or not used), enumerated or state resources (which are placed in one of the available states), capacity resources (where concurrent uses add up), and the like. Such resource types are advantageously described generically by resource constraints. Resource constraints, themselves, determine consistency for multiple allocations for the same resource.

By way of example, Boolean resource allocations, such as space on a belt, must not overlap in time. Conversely, state resource allocations may overlap if they require the same state. Capacity resource allocations may overlap if the sum of the requirements never exceeds the given capacity. Such resource types may be extended easily by changing or adding to the afore-noted resource constraints.

Time intervals of resource allocations may suitably be connected by interval constraints. As defined herein, a resource constraint system and an interval constraint system are orthogonal to one another. A description of resource allocations and timing constraints fit well into a compositional modeling paradigm for scheduling.

Figure 4:
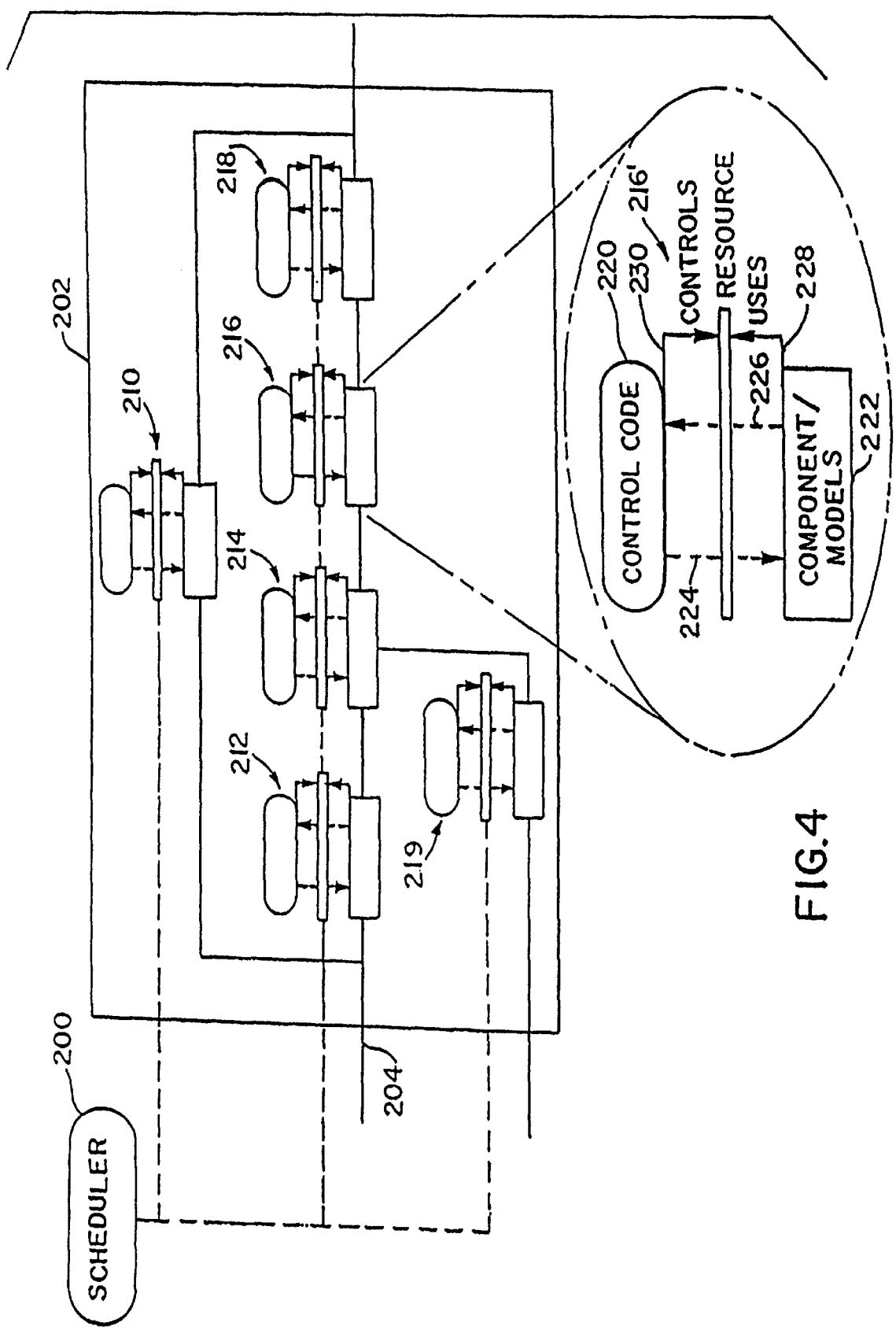
FIG. 4 is a block diagram depicting interaction of scheduler and control code using resources as provided in the subject invention.

Once all components have been fully modeled, a print engine will ultimately be moved to a run time state. Turning particularly to FIG. 4, evidenced therein is a scheduler 200 which is in data communication with a representative print engine module 202. The print engine module 202 is, in turn, comprised of several components, each using resources selectively disposed along a paper/image path 204. Such resources are exemplified by components 210, 212, 214, 216, 218, and 219 (respectively, their resources). Each of these resources is suitably described in the same fashion, a representative one of which is detailed at 216'. A system includes a control code portion 220, a component/models portion 222, and various communication paths. The control path 224 allows for passing of control commands from the control code portion 220 to the component/models portion 222. Similarly, a sensor path 226 allows for communication of sensor data in the opposite direction. A path 228 represents the scheduled use of resources by the component; more precisely, it stands for the communication of knowledge from the model 222 describing the component to the scheduler, where this knowledge is used to schedule correct uses of the resource. A path 230 allows for control and sensor information to be similarly communicated to the scheduler 200.

At run time, when scheduling operations, the scheduler 200 instantiates the interval such that the corresponding allocations for the same resources satisfy required resource constraints. This is also suitably done incrementally by keeping track of past resource allocations.

During a normal operation the scheduler 200 takes into account only its own allocations. To do this, it uses its model of the system to predict a use of resources for operations it has scheduled.

That system is also readily adaptable to a real-time, reactive environment wherein resources sometimes become unavailable or become restricted to a subset of the normal capacity. Such variations in real hardware are typically monitored by a module's control software disposed, in the example, in the control code portion 220. It will be appreciated that in earlier systems, the control software was required to have a special interface to the scheduler in order to communicate deviations between modeled and real hardware or to allow for a scheduler to have access to data of the controlled software.

Resource management within the scheduler 200 is suitably made accessible to an environment. More specifically, it is made available to the component control code as represented by 220. As with the scheduler 200, the control code 220 is then suitably enabled to make for calculations in such resources to reflect changes in the hardware. In turn, this enables the scheduler 200 to automatically take system changes into account.

In the foregoing sense, models are used to define a default behavior (resource allocations) of component capabilities. Meanwhile, control code itself dynamically adapts that behavior to reflect a current situation. This is suitably extended even further if an environment is allowed to change the resource constraints. In general, this means that control software is seen as controlling resources (starting from a default definition), while a scheduler is using those resources.

In an actual on-line implementation, a scheduler will advantageously make such future allocations automatically and take them into account. When the scheduler looks ahead to make further allocations, allocations are suitably tagged with different priorities depending on whether they come from the scheduler 200 (respectively models 222) or from the control code 220. With this, any allocations by the scheduler that are inconsistent with allocations by an environment are suitably identified automatically and may be redone.

The present system presents a new and improved method to automatically derive the capabilities of a print engine configuration for scheduling and control software. By way of example, the capabilities of a print engine module can be derived from the capabilities of the module's components such that a print engine can be configured from such modules, and the resulting print engine can be scheduled and controlled.

The modeling system described in detail above is founded on a concept that print engine modules typically consist of components that perform certain operations on work units, and that a module is described best by describing its components and then deriving the description of the complete module from the descriptions of its components. In particular, module components are modeled as having certain capabilities that they can apply to work units passing through them. In a module, such components are functionally connected. Consequently, a module produces and operates on work units by moving such work units from its entry ports along the connections from component to component selectively and ultimately to its exit ports. During this process, each component applies one of its capabilities to the work units. The capabilities of the complete module arise from the combination of such component capabilities.

Again, by way of example, a module may include components that move sheets of paper as well as images, transfer images onto such sheets, bypass or invert such sheets, etc. One of the module capabilities arising from those component capabilities is suitably characterized by one blank sheet of paper and an image entering the module, and the same sheet of paper with the image on it leaving the module. This capability is further characterized by constraints on work units (such as sheets and images) as well as constraints on resources and the timings of allocations in these resources, as they arise from the corresponding constraints in the component capabilities.

As described in detail above, a component is modeled by describing its capabilities, where each capability is described by defining which work units enter and exit the component, what transformations are performed on the work units, which attribute constraints on the work units have to be satisfied, what resource allocations have to be made, and what constraints on the timings of those allocations have to be satisfied. A configuration of such components (for example, a print engine module) is modeled by describing which components are used, and how their ports are connected. Component ports are connected either to each other or to ports of the module.

Next, a method for deriving module capabilities from component capabilities is described.

In order to derive one capability of a module of components, all components are started and recorded as waiting for input events. Then, one event consisting of one work unit and a variable time interval is posted at one of the entry ports of the module. Next, one of the capabilities of the component connected to that port is executed using that work unit. During execution of the capability, the attribute constraints are executed (that is added to the constraints on the attributes of the work unit), while the resource allocations and timing constraints are collected in a constraint store, and the name and arguments of executed capability are stored in an itinerary list.

Next, an event consisting of the (possibly transformed) work unit and its exit time interval is posted at an exit port of that component, and the component whose capability was executed is restarted and recorded as waiting for input events. If the exit port at which the output event was posted is also an exit port of the module, a capability of the module has been derived. Otherwise, the exit port is also the entry port of a connected component, and the step of executing a capability of that component is repeated as described above. In general, a capability may expect events at one or more entry ports, and a capability may post events at one or more exit ports. A component capability can be executed if all the events it expects at entry ports are present. A module capability has been derived if no more events are waiting at any entry ports.

It will be appreciated that the method of deriving module capabilities just described can also be executed backwards, by initially posting an event at an exit port and interpreting all capabilities backwards.

In such a method of simulating the operation of a module by executing the capabilities of its components, either forwards or backwards, module capabilities can only be derived if all the events expected by the component capabilities are produced by one or more of the connected components. However, by way of example, when deriving capabilities in a forwards fashion, it may happen that a capability expects two or more input events, but only one has been produced so far, and no other capability can be executed and therefore no other component can produce the remaining events. In such a case, the derivation system "pretends" that the missing events have been produced and posts them at the ports of the connected earlier components. Then, capabilities of these connected components are executed, possibly "pretending" in a similar way that their missing input events have been produced. This is repeated, if necessary, until the "pretended" input events are posted at entry ports of the module. It is noted that constraints do not have a built-in direction, and therefore attribute and timing constraints can be executed in either direction, suitably connecting input and output events. When the entire described derivation has terminated, the input and output events will contain work unit descriptions that reflect the inputs accepted and the outputs produced by the module if the derived capability is executed.

It will be appreciated that, besides input and output events, the system may also take control commands into account. That is, if the system not only starts with one or more events posted at module ports, but the user also provides a set of component capabilities to be executed, the system can take these into account as well. This set of capabilities can be interpreted such that either all (and exactly those) capabilities should be executed (maximum), or that at least the provided capabilities should be executed (minimum).

Given such a method that is able to execute component capabilities both forwards and backwards, it will be appreciated that the main direction does not matter for the purpose of deriving capabilities. In general, whenever derivation has not terminated because events are still waiting at component ports, but derivation also cannot proceed because one or more of the expected events are missing at a component, then a component is selected where at least one event has been posted at one of its ports, and the missing events of a capability of the selected component are assumed to be present and are posted at the corresponding ports based on the definition of the capability. It is noted that a preferred main direction of derivation is often forwards, but that a preferred port where the initial event is posted is often an exit port of the module.

It will be appreciated that the described method also works if the module consists of exactly one component.

As noted above, resource allocations and timing constraints R are collected in a constraint store, and the names and arguments of executed component capabilities are stored in an itinerary list C during derivation. This information, together with the accumulated attribute constraints and time intervals of all the events I and O that have been posted at module entry and exit ports, respectively, is recorded as module capability <I,O,R,C>.

The method described so far derives and records one module capability. This method is further augmented with an envisionment and backtracking system. The system works such that after a module capability has been derived and recorded, derivation backtracks, undoing one of the capabilities it has executed earlier and choosing another capability of the same component for execution. If no such capability exists or can be executed in consistency with existing constraints, the system backtracks further, until an alternative capability can be executed. From then on, derivation continues. Similarly, if derivation backtracks to the initial posting of an event, events at other module ports are posted. In such a manner, further module capabilities can be derived and recorded. Derivation of all module capabilities is complete if all component capability alternatives in all components have been explored for events at either all module entry ports or all module exit ports.

It is noted that, especially if a module consists of more than one component, the resulting module capability information can often be simplified. For example, whenever two resources are of the same type and all allocations in those resource are connected by the same equality constraints in all module capabilities, the allocations in one of the two resources are redundant and can be removed without loss of information. Further simplifications will occur to one skilled in the art of constraint processing.

If the module contains loops, it is possible that the system cannot decide by itself when to terminate multiple iterations through the loops. In this case, and if no maximum set of component capabilities is provided as described above, additional functions monitoring the execution of at least one of the components may be provided by the user. By way of example, such a function may monitor a transfer component and only allow it to execute a print capability at most twice during derivation. If such a monitoring functions fails, derivation stops and backtracks.

It will be appreciated that there are several ways in which the system just described can be implemented. By way of example, components may be implemented as concurrent constraint programs generated from the models described in detail above and simulating component capabilities, and a module may be implemented as a set of composed and connected such programs. Derivation is performed by partially evaluating the programs; in particular, event actions and attribute constraints are evaluated, while resource allocations and timing constraints are accumulated without interpretation. Where necessary, the presence of events or control commands is assumed by performing abduction. Monitoring functions can be implemented as concurrent processes. This and other ways of implementing the invention will be apparent to one skilled in the art of constraint programming.

This invention has been described with reference to the preferred embodiment. Obviously, modifications and alterations will occur to others upon a reading and understanding of the specification. It is intended that all such modifications and alterations be included insofar as they come within the scope of the appended claims or the equivalents thereof.

Having thus described the invention, it is now claimed:

1. In a print engine apparatus, a method of determining a capability of the print engine apparatus to assemble a first product described by a first product specification, the method comprising the steps of;

providing a model for a print engine apparatus configuration, the model including an interconnected set of transfer functions characterizing the print engine apparatus configuration, each transfer function among said set of transfer functions describing a capability of at least one of print engine components of the print engine apparatus configuration to generate an input part from an output part, at least one of the print engine components being a physical element of the print engine apparatus, and each print engine component being described independent of any reference to or interaction with other components;

performing an event-based backwards simulation of said model by applying said first product specification to at least one output port of the model; and, determining a capability of the print engine apparatus to assemble said first product described by the first product specification based on a result of said event-based backwards simulation, said event-based backwards simulation acting to compose the capabilities of each of the print engine components by accumulating, attribute constraints; resource allocations and timing constraints; and, names and arguments of an executed capabilities stored in an itinerary list, whereby said capability of the print engine apparatus is realized based on an existence of a posting of a transformed work unit from a first one of the print engine components to an exit port of a second one of the print engine components when said exit port of said second one of the print engine components is said output port of said model of said print engine apparatus.

2. In a print engine including at least two series connected print engine components forming a print engine module, a method for deriving a module capability from component capabilities of the at least two series connected print engine components, the method comprising the steps of:

describing a first one of the series connected print engine components independent of any reference to descriptions of or interactions with other components;

posting a first work unit and a first variable time interval at an input port of the first one of the series connected print engine components;

executing a first capability of said first one of the series connected print engine components using said first work unit to generate a transformed first work unit;

while executing said first capability:

adding attribute constraints I1, O1 of the first executed capability to a set of attribute constraints of the first work unit;

storing resource allocations and timing constraints R1 of the first executed capability in a constraint storage; and, storing a name of the first executed capability and arguments of the first executed capability in an itinerary list C1;

describing a second one of the series connected print engine components independent of any reference to descriptions of or interactions with other components;

posting said transformed first work unit at an exit port of said first one of the series connected print engine components connected to an input port of said second one of the series connected print engine components;

executing a second capability of said second one of the series connected print engine components using said transformed first work unit to generate a second transformed work unit;

while executing said second capability:

adding attribute constraints I2, O2 of the second executed capability to a set of attribute constraints of the transformed first work unit;

storing resource allocations and timing constraints R2 of the second executed capability in said constraint storage; and, storing a name of the second executed capability and arguments of the second executed capability in an itinerary list C2;

posting said second transformed work unit at an exit port of said second one of the series-connected print engine components; and composing the capabilities of each of the components to obtain said capability of said print engine module.

3. The method for deriving a module capability from component capabilities according to claim 2 wherein the step of composing said capability of said print engine module includes defining said capability of said print engine module by accumulating: said attribute constraints I, O; said resource allocations and timing constraints R; and, said names and arguments of said first and second executed capabilities stored in said itinerary list C.

4. The method for deriving a module capability from component capabilities according to claims 2 wherein the step of executing said first capability of said first one of the series connected print engine components include executing said first capability when all of a set of necessary input events of the first capability are satisfied.

5. The method for deriving a module capability from component capabilities according to claim 4 wherein the step of executing said first capability of said first one of the series connected print engine components includes generating a missing necessary input event of the first capability and then executing said first capability using said missing necessary input event and said first work unit.

6. In a machine including at least two series connected machine components forming a machine module, a method for deriving a module capability from component capabilities of the at least two series connected machine components, the method comprising the steps of:

describing a first one of the series connected machine components independent of any reference to descriptions of or interactions with other components;

posting a first work unit, and a first variable time interval at an input port of the first one of the series connected machine components;

executing a first capability of said first one of the series connected machine components using said first work unit to generate a transformed first work unit;

while executing said first capability;
- adding attribute constraints I1, O1 of the first executed capability to a set of attribute constraints of the first work unit;
- storing resource allocations and timing constraints R1 of the first executed capability in a constraint storage; and,
- storing a name of the first executed capability and arguments of the first executed capability in an itinerary list C1;

describing a second one of the series connected machine components independent of any reference to descriptions of or interactions with other components;

posting said transformed first work unit at an exit port of said first one of the series connected machine components connected to an input port of said second one of the series connected machine components;

executing a second capability of said second one of the series connected machine components using said transformed first work unit to generate a second transformed work unit;

while executing said second capability:
- adding attribute constraints I2, O2 of the second executed capability to a set of attribute constraints of the transformed first work unit;
- storing resource allocations and timing constraints R2 of the second executed capability in said constraint storage; and,
- storing a name of the second executed capability and arguments of the second executed capability in an itinerary list C2;

posting said second transformed work unit at an exit port of said second one of the series connected machine components; and composing the capabilities of each of the machine components to obtain said capability of said machine module.

7. The method for deriving a module capability from component capabilities according to claim 6 wherein the step of composing said capabilities of the machine components includes defining said capability of the machine module by accumulating: said attribute constraints I, O; said resource allocations and timing constraints R; and, said names and arguments of the executed capabilities stored in said itinerary list C.

8. The method for deriving a module capability from component capabilities according to claim 6 wherein the step of executing said first capability of said first one of the series connected machine components includes executing said first capability when all of a set of necessary input events of the first capability are satisfied.

9. The method for deriving a module capability from component capabilities according to claim 6 wherein the step of executing said first capability of said first one of the series connected machine components includes generating a missing necessary input event of the first capability and then executing said first capability using said missing necessary input event and said first work unit.

* * * * *